United States Patent [19]

Polak et al.

[11] Patent Number: 4,714,482

[45] Date of Patent: Dec. 22, 1987

[54] THIN FILM POLYMER BLEND MEMBRANES

[75] Inventors: Anthony J. Polak, Lake Zurich; Ping Young, Hoffman Estates, both of Ill.

[73] Assignee: UOP Inc., Des Plaines, Ill.

[21] Appl. No.: 753,753

[22] Filed: Jul. 11, 1985

[51] Int. Cl.$^4$ ............................................. B01D 53/22
[52] U.S. Cl. ....................................... 55/158; 55/16; 55/68
[58] Field of Search ................... 55/16, 68, 158; 204/29 S; 524/41, 406, 413, 557, 909; 525/57, 199

[56] References Cited

U.S. PATENT DOCUMENTS

| | | | |
|---|---|---|---|
| 2,773,050 | 12/1956 | Caldwell et al. | 525/57 X |
| 2,824,620 | 2/1958 | Rosset | 55/16 |
| 3,249,572 | 5/1966 | Davis et al. | 525/57 X |
| 3,265,536 | 8/1966 | Miller et al. | |
| 3,276,910 | 10/1966 | Grasselli et al. | |
| 3,392,096 | 7/1968 | Lawton et al. | |
| 3,401,099 | 9/1968 | McEvoy | |
| 3,489,670 | 1/1970 | Maget | |
| 3,499,265 | 3/1970 | Langley et al. | 55/158 |
| 3,724,672 | 4/1973 | Leonard et al. | 264/41 X |
| 3,980,605 | 9/1976 | Steigelmann et al. | 55/16 X |
| 4,024,036 | 5/1977 | Nakamura et al. | 204/29 S X |
| 4,039,499 | 8/1977 | Steigelmann et al. | 55/16 X |
| 4,040,929 | 8/1977 | Bauer et al. | |
| 4,179,491 | 12/1979 | Howe et al. | 423/253 |
| 4,214,020 | 7/1980 | Ward et al. | 55/16 X |
| 4,280,942 | 7/1981 | Green | 525/57 X |
| 4,295,952 | 10/1981 | de Nora et al. | |
| 4,306,774 | 12/1981 | Nicholson | |
| 4,313,013 | 1/1982 | Harris | |
| 4,323,492 | 4/1982 | Zimmermann et al. | 525/57 X |
| 4,324,760 | 4/1982 | Harris | |
| 4,324,761 | 4/1982 | Harris | |
| 4,373,375 | 2/1983 | Terhune et al. | |
| 4,500,667 | 2/1985 | Polak et al. | 524/413 X |
| 4,560,444 | 12/1985 | Polak et al. | |
| 4,575,532 | 3/1986 | Schmukler et al. | 525/57 |
| 4,581,412 | 4/1986 | Ohmori et al. | 525/199 |
| 4,606,871 | 8/1986 | Krueger et al. | 525/199 X |
| 4,609,468 | 9/1986 | Cramm | 55/16 X |
| 4,636,314 | 1/1987 | Beuhler et al. | 55/158 X |

*Primary Examiner*—Robert Spitzer
*Attorney, Agent, or Firm*—Thomas K. McBride; John F. Spears, Jr.; Raymond H. Nelson

[57] ABSTRACT

Thin film polymer blend membranes which may be used for the separation of gases will consist of a blend of an inorganic compound such as phosphoric acid, sulfuric acid, heteropoly acids or salts of heteropoly acids, an organic polymer such as poly(vinyl alcohol) and a poly organic acid such as poly(acrylic acid), poly(methacrylic acid) or poly(styrene sulfonic acid). The thin film membrane composites may be used as gas separation or gas sensor devices.

19 Claims, No Drawings

THIN FILM POLYMER BLEND MEMBRANES

BACKGROUND OF THE INVENTION

Semipermeable membranes may be used for a wide variety of separations involving liquid-liquid separations, liquid-liquid solid separations and gas-gas separations. The membranes which are employed for these purposes usually comprise various organic polymers or mixtures of organic polymers either alone or supported on a porous backing material. For example, semipermeable membranes which are used in desalination processes can comprise cellulose acetate polymers composited on a porous support which acts as a backing for the membrane, thin film composite membranes comprising polymeric compounds such as polyethyleneimine, epiamine, polyethylene, polypropylene films also composited on a porous support such as a polysulfone member, etc. Likewise, gaseous separation membranes may comprise polymeric membranes of cellulose nitrate or cellulose acetate support membranes having a polymer such as dimethylsilicone, styrene, silicon-carbide copolymers composited thereon, as will as thin film membranes such as polymethylpentene polymers. In addition to these membranes other permselective membranes such as heteropoly acids may be employed for separating gases such as hydrogen from mixtures of gases in a gaseous stream.

In a majority of cases, the admixture of an organic compound, especially in a polymeric state, with an inorganic compound, results in a phase separation due to the fact that the two systems are immiscible in nature. However, we have now discovered that a thin film polymer blend membrane may be fabricated by admixing an inorganic compound of the type hereinafter set forth in greater detail with a combination of an organic polymer and a polyorganic acid which are at least partially compatible with the inorganic compound to form a polymer blended composition of matter which may be utilized as a membrane in a gas separation process. In addition, it was totally unexpected that a thin film membrane could be cast from such blends to provide a membrane which would be highly selective to certain gases and possess a relatively high ionic conductivity, therefore enabling the membrane to be utilized in such separations involving gases such as hydrogen.

In this respect, U.S. Pat. No. 4,500,667 discloses a polymer blend membrane which may be used for gas separation. However, the membrane which is disclosed in this patent is a binary system as compared to the ternary membrane system of the present invention. The binary system which is disclosed by this patent is a membrane comprising a blend of a heteropoly acid or a salt thereof in an amount of from about 10% to about 70% by weight with from about 90% to about 30% by weight of a polymer which is compatible with these acids or salts such as poly(vinyl alcohol), poly(vinyl fluoride), polyethylene oxide, polyethyleneimine, etc. However, it has now been discovered that the ternary membrane system of the present invention will provide membranes which possess resistivities which are much less than the organic-inorganic polymer blends previously found.

BRIEF SUMMARY OF THE INVENTION

This invention relates to compositions of matter which may be used as gas separation membranes. More specifically, the invention is concerned with a novel thin film polymer blend membrane which is used in gas separation processes.

A conventional operation for separating certain gases from a gas stream containing a mixture of gases whereby a desired gas may be separated and recovered involves the use of membranes which possess a high permeability to the molecular form of the desired gas such as oxygen, hydrogen, nitrogen, etc. These membranes, especially in the cause of hydrogen, possess a high permeability to hydrogen whereby molecular hydrogen is transported from the high pressure side of the device, through the membrane and emerges as molecular hydrogen on the low pressure side. Alternatively, separation of gases may be attained by dissociating the desired gas on the high presure side and transporting it as on ion through the membrane followed by recombining the ions on the low pressure side. Therefore, a desirable membrane for hydrogen separation should possess excellent protonic conductivity properties. As will hereinafter be shown in greater detail, we have now discovered that membranes which contain both organic and inorganic components will possess this desired property and therefore may be used as hydrogen sensors, hydrogen separation devices, as well as a solid state thin film electrolyte.

It is therefore an object of this invention to provide novel polymeric membranes which are useful in gas separation devices.

A further object of this invention is to provide a method for preparing organic-inorganic membranes of a type hereinafter set forth in greater detail, said membranes being utilized in gas separation devices.

In one aspect an embodiment of this invention is found in a thin film polymer blend membrane which comprises a blend of an inorganic compound selected from the group consisting of phosphoric acid, sulfuric acid, heteropoly acids and salts of heteropoly acids, an organic polymer and a poly organic acid selected from the group consisting of polymers and copolymers having monomer units of acrylic acid, methacrylic acid and styrene sulfonic acid, said poly(vinyl alcohol) and poly organic acid being compatible with said compound.

Another embodiment of this invention resides in a method for the preparation of a thin film polymer blend membrane which comprises dissolving an inorganic compound selected from the group consisting of phosphoric acid, sulfuric acid, heteropoly acids and salts of heteropoly acids, an organic polymer and a poly organic acid selected from the group consisting of polymers and copolymers having monomer units of acrylic acid, methacrylic acid and styrene sulfonic acid in a mutually miscible solvent at solution conditions for a period of time sufficient to form a blend, casting said blend on a casting surface, removing said solvent, and recovering the resultant membrane.

A specific embodiment of this invention resides in a thin film polymer blend membrane which comprises a blend of orthophosphoric acid, poly(vinyl alcohol) and poly(acrylic acid), said orthophosphoric acid being present in an amount in the range of from about 1 to about 49 mole percent, said poly(vinyl alcohol) being present in an amount in the range of from about 50 to about 95 mole percent and said poly(acrylic acid) being present in a range of from about 1 to about 49 mole percent.

Another specific embodiment of this invention is found in a method for the preparation of a thin film polymer blend membrane which comprises dissolving orthophosphoric acid, poly(vinyl alcohol) and poly(vinyl pyrollidone) in water at a temperature in the range of from about ambient to about 100° C., admixing the resultant admixture for a time sufficient to form a blend, casting said blend on a casting surface, removing said water by evaporation and recovering the resultant thin film membrane.

Other objects and embodiments will be found in the following detailed description of the invention.

DETAILED DESCRIPTION OF THE INVENTION

As hereinbefore set forth, the present invention is concerned with polymer blend membranes which comprise a thin film inorganic-organic blend as well as to a method for the preparation thereof. As was previously discussed, when attempting to blend an organic polymer or a mixture of organic polymers with an inorganic compound, the usual result is to obtain a phase separation. However, in contradistinction to this, it has now been discovered that a useful blend of components may be obtained by admixing certain organic polymeric compounds and poly organic acids with an inorganic compound such as certain inorganic acids or salts thereof, the resulting composition of matter forming a thin film membrane which may be utilized in various applications, especially in gas separation systems. The composition of matter which results from this admixture is not merely a physical mixture but exhibits a degree of interaction, that is, some amount of chemical bonding exists between the components.

The polymer blend of the present invention will exhibit two glass transition temperatures which are attributable to the polymers but occur at different values than the glass transition temperature which is determined for each polymer when it is not mixed with any other substance. In addition, at a relatively low temperature, a second order transition is observed; this is attributable to the inorganic compound. Thus, it may be appreciated that there is a degree of interaction between the components of the mixture, that is, at least some chemical bonding exists between the components. Due to an interaction between all phases, the resulting glass transition temperature (Tg) of the polymer components of the blend will be greater than the operating temperature at which the membrane is employed. Thus, the blend will remain in a solid state and may be used as a membrane. In contradistinction, other ionic conducting polymers will possess glass transition temperatures less than the operating temperatures at which they are to be employed and are therefore in a liquid state. This liquid state renders the polymer inoperable for use as membranes. The use of these membranes in gas separation systems is due in some respects to the fact that the membranes will possess a high protonic conductivity, especially at room or ambient temperature. The membranes which are formed from a blend of mixtures of organic polymers, organic poly acids and certain inorganic acids or salts thereof will possess excellent transport properties as well as an increase in tensile strength over those membranes which are prepared from pure organic polymers. The physical properties which these thin film membranes exhibit thus provide an attractive base for use as gas sensors, especially in the case of hydrogen or as gas separation membranes.

distinct advantage which is possessed by the polymer blend membranes of the present invention over other organic-inorganic blend membranes lies in the fact that the membranes of the present invention possess low resistivities which are four to five orders of magnitude less than other organic-inorganic polymer blends. Inasmuch as in some electronic devices such as hydrogen sensor devices, it is necessary to measure the output voltage, it will be possible when utilizing a membrane of the instant invention to use a lower impedance voltage measuring device. By using such a device, the cost of the package, that is, everything that is required to measure the concentration of hydrogen, will be lowered and thus will provide a more attractive commercial package due to the less costly and simplified electronic device. In addition, a device with reduced impedance is less sensitive to electromagnetic interference than a high impedance device. This permits the device to be located in an electrically noisy environment without adversely affecting its performance.

The desired membrane of the present invention comprises a blend of an inorganic compound selected from the group consisting of a phosphoric acid, sulfonic acid, sulfuric acid, heteropoly acids or salts of heteropoly acids, an organic polymer and an organic poly acid which is selected from the group consisting of polymers and copolymers having monomer units of acrylic acid, methacrylic acid and styrene sulfonic acid. The poly organic acid and the organic polymer are at least partially compatible with the aforementioned inorganic compounds. Examples of phosphoric acids which may be employed will include orthophosphoric acid, metaphosphoric acid, hypophosphoric acid, pyrophosphoric acid, polyphosphoric acid, etc. The sulfuric acid which is employed will comprise an aqueous sulfonic acid which may contain from about 10% to about 40% sulfuric acid in the aqueous solution.

Examples of heteropoly acids or salts thereof which may be employed as the second component of the organic-inorganic blend which may be used to form a membrane will possess the generic formula:

$$A_m[X_xY_yO_z] \cdot nH_2O$$

in which X and Y may be selected from the group consisting of boron, aluminum, gallium, silicon, germanium, tin, phosphorus, arsenic, antimony, bismuth, selenium, tellurium, iodine, and the first, second, third and fourth transitional metal series, said series including scandium, yttrium, lanthanum, actinium, titanium, zirconium, hafnium, vanadium, niobium, tantalum, chromium, molybdenum and tungsten, X and Y being dissimilar in nature, Y being at least one metal selected from the first, second, third or fourth transition metal series above named, A is selected from the group consisting of hydrogen, ammonium, sodium, potassium, lithium, rubidium, cesium, beryllium, magnesium, calcium, strontium and barium, m is an integer of from 1 to 10, y is an integer of from 6 to 12 based on x taken as 1, z is an integer of from 30 to 80 and n is an integer of from 3 to 100.

Specific examples of these compounds will include dodecamolybdophosphoric acid, ammonium molybdophosphate, sodium molybdophosphate, potassium molybdophosphate, lithium molybdophosphate, calcium molybdophosphate, magnesium molybdophosphate, dodecatungstophosphoric acid, ammonium tungstophosphate, sodium tungstophosphate, potassium tungstophosphate, lithium tungstophosphate, calcium tungstophosphate, magnesium tungstophosphate, dodecamolybdosilicic acid, ammonium molybdosilicate, sodium molybdosilicate, potassium molybdosilicate, lithium molybdosilicate, calcium molybdosilicate, magnesium molybdosilicate, dodecamolybdogermanic acid, ammonium molybdogermanate, sodium molybdogermanate, potassium molybdogermanate, lithium molybdogermanate, calcium molybdogermanate, magnesium molybdogermanate, hexamolybdotelluric acid, ammonium molybdotellurate, sodium molybdotellurate, potassium molybdotellurate, lithium molybdotellurate, calcium molybdotellurate, magnesium molybdotellurate, dodecatungstosilicic acid, ammonium tungstosilicate, sodium tungstosilicate, potassium tungstosilicate, lithium tungstosilicate, calcium tungstosilicate, magnesium tungstosilicate, etc. It is also contemplated within the scope of this invention that some uranyl compounds may also be employed as the heteropoly acid or salt thereof. These uranyl compounds will possess the generic formula:

$$A[UO_2]XO_4 \cdot nH_2O$$

in which A is selected from the group consisting of hydrogen, lithium, sodium, potassium, ammonium, copper, magnesium, calcium, barium, strontium, lead, iron, cobalt, nickel, manganese and aluminum, X is selected from the group consisting of phosphorus and arsenic and n is an integer of from 1 to 4. Some specific examples of these uranyl compounds will include uranyl orthophosphate, uranyl orthoarsenate, lithium uranyl phosphate, lithium uranyl arsenate, sodium uranyl phosphate, sodium uranyl arsenate, potassium uranyl phosphate, potassium uranyl arsenate, ammonium uranyl phosphate, ammonium uranyl arsenate, calcium uranyl phosphate, calcium uranyl arsenate, barium uranyl phosphate, barium uranyl arsenate, copper uranyl phosphate, copper uranyl arsenate, iron uranyl phosphate, iron uranyl arsenate, cobalt uranyl phosphate, cobalt uranyl arsenate, nickel uranyl phosphate, nickel uranyl arsenate, etc.

Examples of organic polymers which may be employed as a component of the blend of the present invention will include poly(vinyl alcohol) also known as PVA, poly(vinyl fluoride), polyethylimine, polyethylene glycol, cellulose acetate, polyvinylmethylethyl ether, phenol formaldehyde resins, etc., or copolymers thereof.

It is to be understood that the aforementioned listing of inorganic compounds, organic polymers and organic poly acids are only representative of the class of compounds which may be employed in formulating the inorganic-organic blends of the present invention, and that this invention is not necessarily limited thereto.

The novel compositions of matter of the present invention are prepared by admixing the three components of the blend, that is, the inorganic compound, the organic polymer and the poly organic acid of the type hereinbefore set forth in greater detail in a mutually miscible solvent at solution conditions for a period of time sufficient to form the desired blend. In the preferred embodiment of the invention the mutually miscible solvent which is employed to dissolve the components comprises water, although it is contemplated within the scope of this invention that any other mutually miscible solvent, either inorganic or organic in nature may also be employed. The mixing of the three components of the composition of matter may be effected at solution conditions which will include a temperature in the range of from about ambient (20°-25° C.) up to the boiling point of the mutually miscible solvent which, for example, in the case of water is 100° C. The time of reaction which is necessary to form the desired blend will vary with the particular organic polymers and an inorganic compound as well as the solvent and may be within a period of time ranging from about 0.5 up to about 10 hours or more in duration. Upon completion of the reaction period, the blend is cast upon a suitable casting surface which may consist of any suitable material sufficiently smooth in nature so as to provide a surface free of any defects which may cause imperfections on the surface of the membrane. Examples of suitable casting surfaces may include metals such as stainless steel, aluminum, etc., glass, polymer or ceramics. After casting the solution upon the surface, the solvent is then removed by any conventional means including natural evaporation or forced evaporation by the application of elevated temperatures whereby said solvent is evaporated and the desired membrane comprising a thin film of the polymeric blend is formed. In the preferred embodiment of the invention, the polymeric blend of inorganic-organic compounds will possess a molecular weight ranging from about 2000 up to about 135,000 and preferably greater than 10,000. The thickness of the film can be controlled by the amount of inorganic compound and/or the polymer which is present in the reaction mixture. In this respect it is to be noted that the amounts of inorganic compound, organic polymer and poly organic acid may vary over a relatively wide range. For example, the inorganic compound which comprises a phosphoric acid, sulfuric acid, heteropoly acid or salts thereof may be present in the blend or membrane in a range of from about 1 to about 49 mole percent, the organic polymer may be present in the blend or membrane in a range of from about 50 to about 95 mole percent and the poly organic acid may be present in the blend or membrane in a range of from about 1 to about 49 mole percent. The thin film inorganic-organic blend which is prepared according to the process of the present invention will possess a thickness which may range from about 0.1 to about 50 microns, and preferably a thickness of from about 5 to about 20 microns.

The polymer blend membranes of the present invention may be prepared by placing a predetermined amount of each of the components of the blend, namely, the inorganic compound, the organic polymer and the poly organic acid, in an appropriate apparatus such as a flask. After adding the mutually miscible solvent, the mixture is allowed to remain, after thorough admixing thereof, for a predetermined period of time within the range hereinbefore set forth. As an example, orthophosphoric acid, poly(vinyl alcohol) and poly(acrylic acid) may be placed in a flask and dissolved in water which has been heated to a temperature of 100° C. Upon completion of the desired residence time, the solution is cast upon an appropriate casting surface and the water or other solvent is removed. The desired and resulting polymer blend membrane is then recovered and utilized in an appropriate gas separation apparatus or gas sensor apparatus.

Some representative examples of a thin film polymer blend membrane which may be prepared according to the process of this invention will comprise orthophosphoric acid-poly(vinyl alcohol)-poly(acrylic acid), pyrophosphoric acid-poly(vinyl alcohol)-poly(acrylic acid), sulfuric acid-poly(vinyl alcohol)-poly(acrylic acid), dodecamolybdophosphoric acid-poly(vinyl alcohol)-poly(acrylic acid), dodecatungstophosphoric acid-poly(vinyl alcohol)-poly(acrylic acid), dodecamolybdosilicic acid-poly(vinyl alcohol)-poly(acrylic acid), ammonium molybdophosphate-poly(vinyl alcohol)-poly(acryllic acid), uranyl orthophosphate-poly(vinyl alcohol)-poly-(acrylic acid), orthophosphoric acid-poly(vinyl alcohol)-poly(methacrylic acid), pyrophosphoric acid-poly(vinyl alcohol)-poly(methacrylic acid), sulfuric acid-poly(vinyl alcohol)-poly(methacrylic acid), dodecamolybdophosphoric acid-poly(vinyl alcohol)-poly(methacrylic acid), dodecatungstophosphoric acid-poly(vinyl alcohol)-poly(methacrylic acid), dodecamolybdosilicic acid-poly(vinyl alcohol)-poly(methacrylic acid), ammonium molybdophosphate-poly(vinyl fluoride)-poly(methacrylic acid), uranyl orthophosphate-poly(vinyl fluoride)-poly(methacrylic acid), orthophosphoric acid-poly(vinyl alcohol)-poly(styrene sulfonic acid), pyrophosphoric acid-poly(vinyl alcohol)-poly(styrene sulfonic acid), sulfuric acid-polyethylene glycol-poly(styrene sulfonic acid), dodecamolybdophosphoric acid-poly(vinyl alcohol)-poly(styrene sulfonic acid), dodecatungstophosphoric acid-poly(vinyl alcohol)-poly(styrene sulfonic acid), dodecamolybdosilicic acid-polyethylene glycol-poly(styrene sulfonic acid), ammonium molybdosulfate-celluose acetate)-poly(styrene sulfonic acid), uranyl orthophosphate-poly(vinyl alcohol)-poly(styrene sulfonic acid).

It is also contemplated within the scope of this invention that the thin film polymer blend membranes may, if so desired, be composited on a solid porous support whereby increased structural strength will be imparted to the membrane. These membranes will possess the same desirable characteristics as the unsupported membranes such as tensile strength, mechanical properties, electrical properties, yield strength, etc., and in addition, will also possess added structural strength, thus permitting the membrane to be utilized in such devices where the membrane may be subjected to forces of increased strength.

The supported membrane may be prepared in a manner similar to that set forth with regard to the unsupported membrane. For example, the thin film semipermeable portion of the membrane composite may be prepared by admixing the three components of the blend in a mutually miscible solvent at solution conditions for a period of time sufficient to form the desired blend. Again, the time of reaction which is necessary to form the desired blend will vary with the particular poly organic acid, organic polymer and inorganic compound which have been selected to form the desired membrane. After allowing the mixture to stand for a period of time sufficient to form the desired blend, the solution is cast upon a porous support. It is contemplated within the scope of this invention that any relatively open-celled foam or porous substrate which possesses a structural strength greater than the thin film membrane may be employed. Some examples of these porous supports will include compounds such as glass cloth, polysulfone, cellulose acetate, polyamides ceramics such as alumina, glass, porcelain, etc. which have been fabricated to possess the necessary porosity, etc. The amount of blend which is cast upon the porous support will be that which is sufficient to form a thin film membrane having a thickness within the range previously set forth. After casting, the mutually miscible solvent such as water is removed by conventional means such as normal evaporation or forced evaporation by the application of external heat, application of vacuum, etc., and the desired membrane comprising the thin film blend composited on the porous support may be recovered and utilized in an appropriate gas separation apparatus or gas sensor apparatus.

Examples of novel thin film inorganic-organic polymer blends which are composited on a solid support and which may be prepared according to the process of the present invention will include orthophosphoric acid-poly(vinyl alcohol)-poly(acrylic acid) composited on a glass cloth, orthophosphoric acid-poly(vinyl alcohol)-poly(acrylic acid) composited on polysulfone, orthophosphoric acid-poly(vinyl alcohol)-poly(acrylic acid) composited on cellulose acetate, orthophosphoric acid-poly(vinyl alcohol)-poly(acrylic acid) composited on alumina, pyrophosphoric acid-poly(vinyl alcohol)-poly(acrylic acid) composited on a glass cloth, pyrophosphoric acid-poly(vinyl alcohol)-poly(acrylic acid) composited on polysulfone, pyrophosphoric acid-poly(vinyl alcohol)-poly(acrylic acid) composited on cellulose acetate, pyrophosphoric acid-poly(vinyl alcohol)-poly(acrylic acid) composited on alumina, sulfuric acid-poly(vinyl alcohol)-poly(acrylic acid) composited on a glass cloth, sulfuric acid-poly(vinyl alcohol)-poly(acrylic acid) composited on polysulfone, sulfuric acid-poly(vinyl alcohol)-poly(acrylic acid) composited on cellulose acetate, sulfuric acid-poly(vinyl fluoride)-poly(acrylic acid) composited on alumina, dodecamolybdophosphoric acid-poly(vinyl alcohol)-poly(acrylic acid) composited on a glass cloth, dodecamolybdophosphoric acid-poly(vinyl fluoride)-poly(acrylic acid) composited on polysulfone, dodecamolybdophosphoric acid-polyethylene glycol-poly(acrylic acid) composited on cellulose acetate, dodecamolybdophosphoric acid-cellulose acetate)-poly(acrylic acid) composited on alumina, dodecatungstophosphate-polyethylimine-poly(acrylic acid) composited on a glass cloth, dodecatungstophosphate-poly(vinyl alcohol)-poly(acrylic acid) composited on polysulfone, dodecatungstophosphate-poly(vinyl alcohol)-poly(acrylic acid) composited on cellulose acetate, dodecatungstophosphate-polyethylene glycol-poly(acrylic acid) composited on alumina, dodecamolybdosilicic acid-poly(vinyl alcohol)-poly(acrylic acid) composited on a glass cloth, dodecamolybdosilicic acid-poly(vinyl alcohol)-poly(acrylic acid) composited on polysulfone, dodecamolybdosilicic acid-poly(vinyl alcohol)-poly(acrylic acid) composited on cellulose acetate, dodecamolybdosilicic acid-poly(vinyl alcohol)-poly(acrylic acid) composited on alumina, ammonium molybdophosphate-poly(vinyl alcohol)-poly(acrylic acid) composited on glass cloth, ammonium molybdophosphate-poly(vinyl alcohol)-poly(acrylic acid) composited on polysulfone, ammonium molybdophosphate-poly(vinyl alcohol)-poly(acrylic acid) composited on cellulose acetate, ammonium molybdophosphate-polyvinylmethylethyl ether-poly(acrylic acid) composited on alumina, uranyl orthophosphate-poly(vinyl alcohol)-poly(acrylic acid) composited on a glass cloth, uranyl orthophosphate-poly(vinyl alcohol)-poly(acrylic acid) composited on polysulfone, uranyl orthophosphate-polyethylene glycol-poly(acrylic acid) composited on cellulose acetate, uranyl orthophosphate-poly(vinyl fluoride)-poly(acrylic acid) composited on alumina, orthophosphoric acid-poly(vinyl alcohol)-poly(methacrylic acid) composited on a glass cloth, orthophosphoric acid-poly(vinyl alcohol)-poly(styrene sulfonic acid) composited on polysulfone, orthophosphoric acid-poly(vinyl alcohol)-poly(methacrylic acid) composited on cellulose acetate, orthophosphoric acid-poly(vinyl alcohol)-poly(styrene sulfonic acid) composited on alumina, pyrophosphoric acid-poly(vinyl alcohol)-poly(methacrylic acid) composited on a glass cloth, pyrophosphoric acid-poly(vinyl fluoride)-poly(styrene sulfonic acid) composited on polysulfone, pyrophosphoric acid-polyethylene glycol-poly(methacrylic acid) composited on cellulose acetate, pyrophosphoric acid-poly(vinyl alcohol)-poly(styrene sulfonic acid) composited on alumina, sulfuric acid-poly(vinyl alcohol)-poly(methacrylic acid) composited on a glass cloth, sulfuric acid-poly(vinyl alcohol)-poly(styrene sulfuric acid) composited on polysulfone, sulfuric acid-polyethylene glycol-poly(methacrylic acid) composited on cellulose acetate, sulfuric acid-poly(vinyl alcohol)-poly(styrene sulfonic acid) composited on alumina, dodecamolybdophosphoric acid-polyvinylmethylethyl ether-poly(methacrylic acid) composited on a glass cloth, dodecamolybdophosphoric acid-polyethylimine-poly(stryene sulfonic acid) composited on polysulfone, dodecamolybdophosphoric acid-poly(vinyl alcohol)-poly(methacrylic acid) composited on cellulose acetate, dodecamolybdophosphoric acid-poly(vinyl alcohol)-poly(styrene sulfonic acid) composited on alumina, dodecatungstophosphate-poly(vinyl fluoride)-poly(methacrylic acid) composited on a glass cloth, dodecatungstophosphate-poly(vinyl alcohol)-poly(styrene sulfonic acid) composited on polysulfone, dodecatungstophosphate-polyethylene glycol-poly(methacrylic acid) composited on cellulose acetate, dodecatungstophosphate-poly(vinyl alcohol)-poly(styrene sulfonic acid) composited on alumina, dodecamolybdosilicic acid-cellulose acetate-poly(methacrylic acid) composited on a glass cloth, dodecamolybdosilicic acid-poly(vinyl alcohol)-poly(styrene sulfonic acid) composited on polysulfone, dodecamolybdosilicic acid-poly(vinyl fluoride)-poly(methacrylic acid) composited on cellulose acetate, dodecamolybdosilicic acid-poly(vinyl alcohol)-poly(styrene sulfonic acid) composited on alumina, ammonium molybdophosphate-polyethylimine-poly(methacrylic acid) composited on a glass cloth, ammonium molybdophosphate-poly(vinyl alcohol)-poly(styrene sulfonic acid) composited on polysulfone, ammonium molybdophosphate-poly(vinyl alcohol)-poly(methacrylic acid) composited on cellulose acetate, ammonium molybdophosphate-poly(vinyl alcohol)-poly(styrene sulfonic acid) composited on alumina, uranyl orthophosphate-poly(vinyl alcohol)-poly(methacrylic acid) composited on a glass cloth, uranyl orthophosphate-poly(vinyl fluoride)-poly(styrene sulfonic acid) composited on polysulfone, uranyl orthophosphate-poly(vinyl alcohol)-poly(methacrylic acid) composited on cellulose acetate, uranyl orthophosphate-polyethylene glycol-poly(styrene sulfonic acid) composited on alumina, etc. Again, it is to be understood that the aforementioned list of thin film polymer blend membranes either unsupported or supported in nature are only representative of the class of membrane composites which may be prepared according to the present invention, and that said invention is not necessarily limited thereto.

The following examples are given for purposes of illustrating the novel thin film polymer blend membranes and the process for preparing the same. However, it is to be understood that these examples are merely illustrative in nature and that the present invention is not necssarily limited thereto.

EXAMPLE I

Three stock solutions were prepared by dissolving 10 grams of poly(vinyl alcohol) having a molecular weight of 133,000 in 500 ml of deionized water; 5 grams (20 ml) of poly(acrylic acid) having a molecular weight of 90,000 was dissolved in 250 ml of deionized water and 14.7 grams (10 ml) of 14.45 Molar orthophosphoric acid was dissolved in 100 ml of deionized water. To prepare the novel polymer blend membrane of the present invention, 12.5 ml of stock poly(vinyl alcohol) solution, 4.1 ml of stock solution of poly(acrylic acid) and 3.1 ml of a stock solution of orthophosphoric acid were thoroughly admixed, the mole ratio of the resulting blend being 5:1:4 moles (monomer mole ratio) of poly(vinyl alcohol) to poly(acrylic acid) to orthophosphoric acid. The solution was then poured into an evaporating dish and the water was allowed to evaporate for a period of 16 hours. The resulting blended film was clear in color and possessed a thickness of 50 microns.

The thin film membrane was cut into four discs having a 1" diameter and electrodes were sputter-dispersed onto both sides of the discs. The electrode material comprised a platinum target and was sputtered onto the membrane film for a period of five minutes per side. The electrodes had a ½" diameter and a thickness of ~400 Angstroms.

EXAMPLE II

The disc of novel polymer blend membranes which was prepared according to Example I above was then placed into a Teflon cell being positioned in the middle of the cell so as to render the two sides of the cell airtight. When a reference gas consisting of 100% hydrogen was placed on both sides of the cell, there was 0 voltage and 0 current. When a reference gas consisting of 100% hydrogen was placed on one side of the cell and a working gas comprising 10% hydrogen and 90% nitrogen was placed on the other side of the cell and the gases were continuously flushed through the cell, the initial output EMF of 29.1 millivolts was generated. The gases were continuously flushed through the cell for a period of 24 hours and the voltage and current readings, both initially and at the end of 24 hours are set forth in the table below:

TABLE

| Output | |
|---|---|
| Initial voltage (mV) | 29.1 |
| Initial current (A) | $1.5 \times 10^{-3}$ |
| 24 hr. voltage (mV) | 29.1 |
| 24 hr. current (A) | $6.76 \times 10^{-5}$ |

It is to be noted that the voltage across the polymer blend membrane remains constant while there is a slight decrease in the amount of current. However, this decrease is a normal occurrence in view of the fact that there was still a relatively minor amount of water present in the membrane at the initial stage of the test.

EXAMPLE III

In a manner similar to that set forth in Example I above, other organic-inorganic membranes may be prepared by blending poly(vinyl alcohol), poly(vinyl fluoride), polyethylene glycol, cellulose acetate or polyethylene oxide with sulfuric acid, pyrophosphoric acid, dodecamolybdophosphoric acid or uranyl orthophosphate and poly(methacrylic acid) or poly(styrene sulfonic acid). The resulting membranes may then be treated by sputter depositing platinum or palladium on both sides of the membrane to a thickness of from about 100 to about 400 Angstroms and the resulting composite utilized in a gas separation apparatus.

We claim as our invention:

1. A thin film polymer blend membrane comprised of a solution blend of (1) a component selected from the group consisting of (i) an organic polymer selected from the group consisting of polyvinyl alcohol, polyvinylfluoride, polyethyleneimine, polyethylene glycol, cellulose acetate, polyvinylmethylethyl ether and phenol formaldehylde resins and (ii) a copolymer having as a repeat unit one of the monomers of component (i), (2) a component selected from the group consisting of (i) a polymer selected from the group consisting of polyacrylic acid, polymethacrylic acid and polystyrene sulfonic acid and (ii) a copolymer having as a repeat unit one of the monomers of component (i), and (3) an inorganic compound selected from the group consisting of phosphoric acid, sulfuric acid, heteropoly acids and salts of heteropoly acids.

2. The membrane as set forth in claim 1 in which said inorganic compound comprises orthophosphoric acid.

3. The membrane as set forth in claim 1 in which said inorganic compound comprises pyrophosphoric acid.

4. The membrane as set forth in claim 1 in which said inorganic compound comprises sulfuric acid.

5. The membrane as set forth in claim 1 in which said inorganic compound comprises dodecamolybdophosphoric acid.

6. The membrane as set forth in claim 1 in which said inorganic acid compound comprises uranyl orthophosphate.

7. The membrane as set forth in claim 1 in which said poly organic acid is poly(acrylic acid).

8. The membrane as set forth in claim 1 in which said poly organic acid is poly(methacrylic acid).

9. The membrane as set forth in claim 1 in which said organic polymer is poly(vinyl alcohol).

10. The membrane as set forth in claim 1 in which said organic polymer is poly(vinyl fluoride).

11. The membrane as set forth in claim 1 in which said inorganic compound is present in said membrane in a range of from about 1 to about 49 mole percent, said organic polymer is present in a range of from about 50 to about 95 mole percent and said poly organic acid is present in a range from about 1 to about 49 mole percent.

12. The membrane as set forth in claim 1 in which said inorganic compound is orthophosphoric acid, said organic polymer is poly(vinyl alcohol) and said poly organic acid is poly(acrylic acid).

13. The membrane as set forth in claim 1 in which said inorganic compound is orthophosphoric acid, said organic polymer is poly(vinyl alcohol) and said organic acid is poly(methacrylic acid).

14. The membrane as set forth in claim 1 in which said inorganic compound is sulfuric acid, said organic polymer is poly(vinyl fluoride) and said poly organic acid is poly(acrylic acid).

15. The membrane as set forth in claim 1 in which said inorganic compound is uranyl orthophosphate, said organic polymer is poly(vinyl alcohol) and said poly organic acid is poly(styrene sulfonic acid).

16. The membrane as set forth in claim 1 in which said membrane possesses a thickness in the range of from about 0.1 to about 50 microns.

17. The membrane as set forth in claim 1 being composited on a porous solid support.

18. The membrane as set forth in claim 17 in which said porous solid support comprises glass cloth.

19. The membrane as set forth in claim 17 in which said porous solid support comprises polysulfone.

* * * * *